(12) United States Patent
Merems et al.

(10) Patent No.: US 8,210,465 B2
(45) Date of Patent: Jul. 3, 2012

(54) METHODS AND APPARATUS FOR AIRBORNE UNPOWERED ROTOR DELIVERY SYSTEMS

(75) Inventors: Paul A. Merems, Tucson, AZ (US); Randy W. Hill, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 101 days.

(21) Appl. No.: 12/577,953

(22) Filed: Oct. 13, 2009

(65) Prior Publication Data

US 2010/0030403 A1 Feb. 4, 2010

Related U.S. Application Data

(62) Division of application No. 11/298,101, filed on Dec. 9, 2005, now Pat. No. 7,677,491.

(60) Provisional application No. 60/705,984, filed on Aug. 5, 2005.

(51) Int. Cl.
B64C 27/22 (2006.01)
B64C 27/00 (2006.01)

(52) U.S. Cl. .......................................... 244/8; 244/17.11

(58) Field of Classification Search .................... 244/16, 244/13, 14, 118.1, 118.2, 46, 17.11, 8, 36, 244/37, 17.27, 4 A, 138 R
See application file for complete search history.

(56) References Cited

U.S. PATENT DOCUMENTS

| | | | | |
|---|---|---|---|---|
| 2,027,162 A | * | 1/1936 | Goldman | 446/37 |
| 2,110,443 A | | 3/1938 | Larsen et al. | |
| 2,380,278 A | | 10/1945 | Weissman et al. | |
| 2,684,213 A | * | 7/1954 | Robert et al. | 244/8 |
| 2,978,211 A | * | 4/1961 | Wannlund et al. | 244/138 A |
| 3,175,619 A | * | 3/1965 | Reed, Jr. | 416/37 |
| 3,194,519 A | * | 7/1965 | Rhodes | 244/138 A |
| D203,722 S | * | 2/1966 | Prewitt | D12/327 |
| 3,321,021 A | | 5/1967 | Girard et al. | |
| 3,361,396 A | | 1/1968 | Reno | |
| 3,401,906 A | | 9/1968 | Girard | |
| 3,428,271 A | | 2/1969 | Barzda et al. | |
| 3,838,940 A | | 10/1974 | Hollrock | |
| 3,870,251 A | | 3/1975 | Breuner | |
| 4,017,043 A | | 4/1977 | Barzda | |
| 4,059,247 A | * | 11/1977 | Prewitt | 244/7 R |
| 4,106,727 A | * | 8/1978 | Ortell | 244/49 |
| 4,131,392 A | | 12/1978 | Barzda | |

(Continued)

FOREIGN PATENT DOCUMENTS

DE 20303024 U1 8/2003

OTHER PUBLICATIONS

McCauley, Howard, Half Knot Project Overview.
Supplemental Search Report from corresponding European Application No. 06851122.9.

*Primary Examiner* — Tien Dinh
(74) *Attorney, Agent, or Firm* — Renner, Otto, Boisselle & Sklar, LLP (57) ABSTRACT

In various representative aspects, an airborne delivery system according to various aspects of the present invention comprises a container and an autorotating rotor system. The container may contain contents, and the rotor system facilitates control of at least a portion of the flight of the airborne system and the descent. Exemplary features may include a guidance system, for example to guide and control the airborne system, and a wing for gliding.

7 Claims, 7 Drawing Sheets

U.S. PATENT DOCUMENTS

| | | |
|---|---|---|
| 4,163,535 A | 8/1979 | Austin |
| 4,998,689 A * | 3/1991 | Woodcock .................... 244/46 |
| 5,452,864 A | 9/1995 | Alford et al. |
| 5,671,899 A | 9/1997 | Nicholas et al. |
| 6,576,880 B2 * | 6/2003 | Martorana et al. ............. 244/3.1 |
| 6,604,706 B1 | 8/2003 | Bostan |
| 6,615,165 B2 | 9/2003 | Carroll |
| 6,923,404 B1 * | 8/2005 | Liu et al. ....................... 244/46 |
| 6,942,184 B1 | 9/2005 | Morris |

\* cited by examiner

METHODS AND APPARATUS FOR AIRBORNE UNPOWERED ROTOR DELIVERY SYSTEMS

CROSS-REFERENCES TO RELATED APPLICATIONS

This application is a divisional application of U.S. patent application Ser. No. 11/298,101, filed Dec. 9, 2005 now U.S. Pat. No. 7,677,491, which claims the benefit of U.S. Provisional Patent Application No. 60/705,984, filed Aug. 5, 2005, entitled Methods and Apparatus for delivery vehicle with autogyro descent.

BACKGROUND OF INVENTION

Transporting supplies has been an important concern in nearly every commercial, military, or other endeavor. A vast infrastructure has developed over the centuries to get supplies where they are needed as quickly and economically as possible, including ocean-borne shipping, railroads, airborne cargo, highways, and trucking. These developments handle the bulk of modern transportation requirements.

In some conditions, however, conventional transportation fails to deliver when and where the supplies are needed most. Catastrophes, both natural and man-made, often disrupt the usual supply chains for food, clean water, clothing, and medicine by damaging facilities, destroying railroad tracks, blocking roads, and wrecking bridges. Other supply conditions are likewise hostile to land- and sea-based supply chains. For example, supplying isolated troops or other personnel in remote areas may not be possible with trucks, railroads, and ships.

With the advent of large aircraft, aerial supply presented a practical method for supplying remote or cut-off areas. If the aircraft could land safely, the supplies could be unloaded manually and the aircraft could return to its base. If the aircraft could not land, however, supplies could be air-dropped, using a parachute to slow the descent of a container holding the supplies.

Air-dropped supplies, however, require the aircraft to approach the area where the supplies are needed, potentially exposing the crew to hostile fire or other high-risk conditions. Further, air-dropped supplies are subject to wind and weather conditions, making it difficult to place supplies where they are needed. Consequently, the supplies may not be accessible to those who need them, and may even be found and used by hostile personnel.

SUMMARY OF THE INVENTION

An airborne delivery system according to various aspects of the present invention comprises a container and an autorotating rotor system. The container may contain contents, and the rotor system facilitates control of at least a portion of the flight of the airborne system and the descent. Exemplary features may include a guidance system, for example to guide and control the airborne system, and a wing for gliding.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, a system according to various aspects of the present invention may employ launch systems, guidance systems, rotor systems, containers, autorotation systems, control surfaces, and the like, which may carry out a variety of functions. In addition, the present invention may be practiced in conjunction with any number of airborne applications, and the systems described are merely exemplary applications for the invention. Further, a system according to the present invention may employ any number of techniques for placing the airborne system in flight, deploying the autorotating rotor system, guiding the airborne system, and the like.

Figure 1:
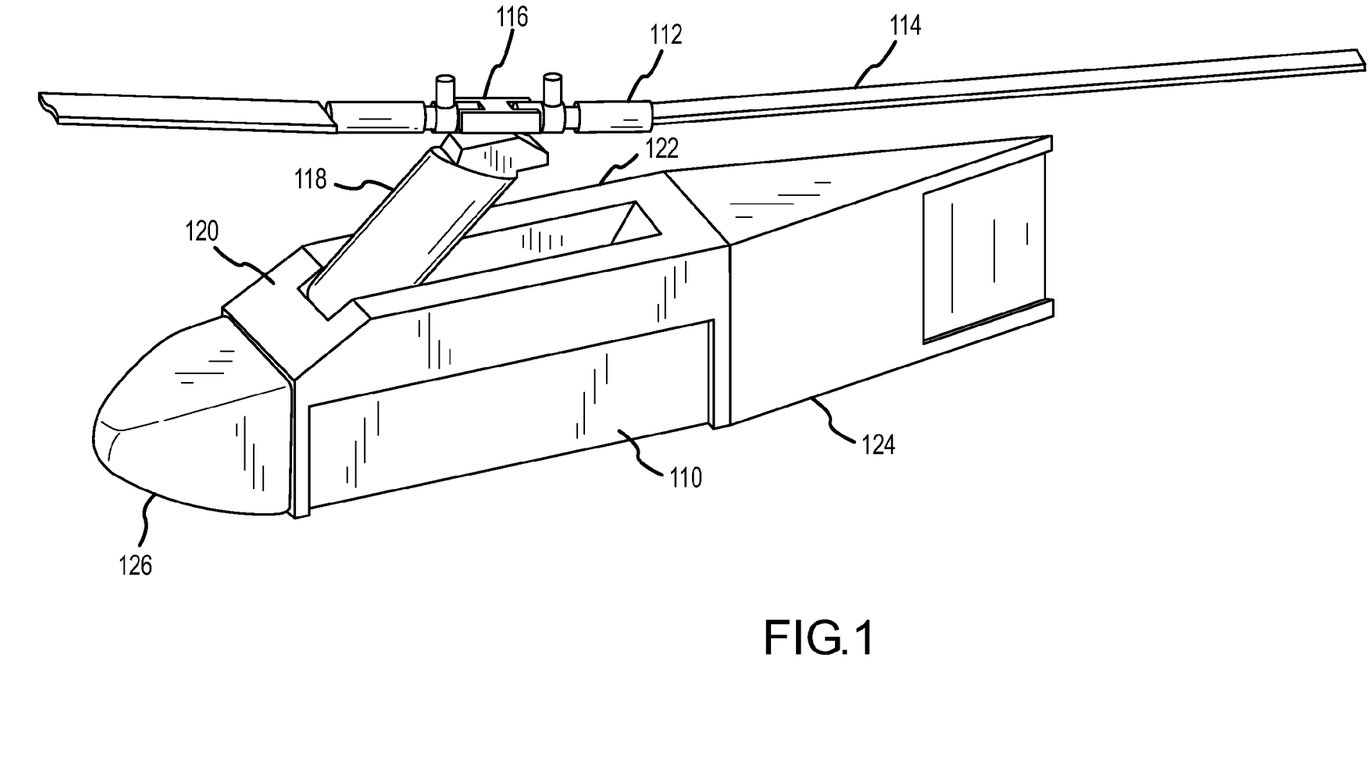
FIG. 1 representatively illustrates an autorotating airborne delivery system according to various aspects of the present invention.

Methods and apparatus for flight may operate in conjunction with an autorotating airborne delivery system 100. An exemplary autorotating airborne system 100 configured for unmanned delivery of a payload comprises a payload container 110 and a rotor system 112. The rotor system 112 is connected to the payload container 110 to control the delivery of the payload container 110 while in flight.

The container 110 provides space for transporting items to a target location. The container 110 may comprise any suitable container 110 or holder. For example, the container 110 may comprise a conventional metal shipping container 110 for transporting items. Alternatively, the container 110 may be configured for flight, such as comprising light, rugged material, and with a streamlined shape to improve airflow around the container 110. Further, the container 110 exterior and interior may be configured in any suitable manner, such as to cushion or otherwise protect contents, deploy systems upon landing, provide seating for occupants or pilots, and provide access to contents.

Referring to FIG. 1, in the present embodiment, the container 110 comprises an unmanned container, such as for delivering military or emergency supplies, and is suitably configured to deliver at least about a 300-lb. payload. The container 110 has rectangular sides, and is comprised of a lightweight, rugged material, such as an aluminum alloy or durable plastic. The container 110 may also comprise low visibility materials to reduce potential detection of the airborne system 100, such as visually or by radar. The container 110 may also include one or more connecting points for connecting directly or indirectly to the rotor system 112. The container 110 may be permanently or detachably connected to the rotor system 112.

The rotor system 112 comprises an autorotating rotor configured to provide lift for the autorotating airborne system 100. The rotor system 112 may comprise any suitable autorotating rotor. In the present embodiment, the rotor system 112 comprises a rotor system 112 configured to autorotate during flight. The rotor system 112 is suitably unpowered such that the rotor system 112 autorotates during regular flight without an engine or other power source. The rotor system 112 is suitably configured to provide stable maneuvering at low air speeds and/or under adverse wind conditions. The rotor system 112 may facilitate a near-vertical descent for delivery of the container 110, and the rotor system 112 may be configured to control the speed and lateral movement of the autorotating airborne system 100 during descent.

For example, in the present embodiment, the rotor system 112 comprises multiple blades 114, a rotor head 116, and a mast 118. The blades 114 are connected to the rotor head 116, and the rotor head 116 is mounted on the mast 118. The rotor head 116 and/or the mast 118 are configured to substantially freely rotate to facilitate autorotation when the airborne system 100 is in flight.

Figure 2:
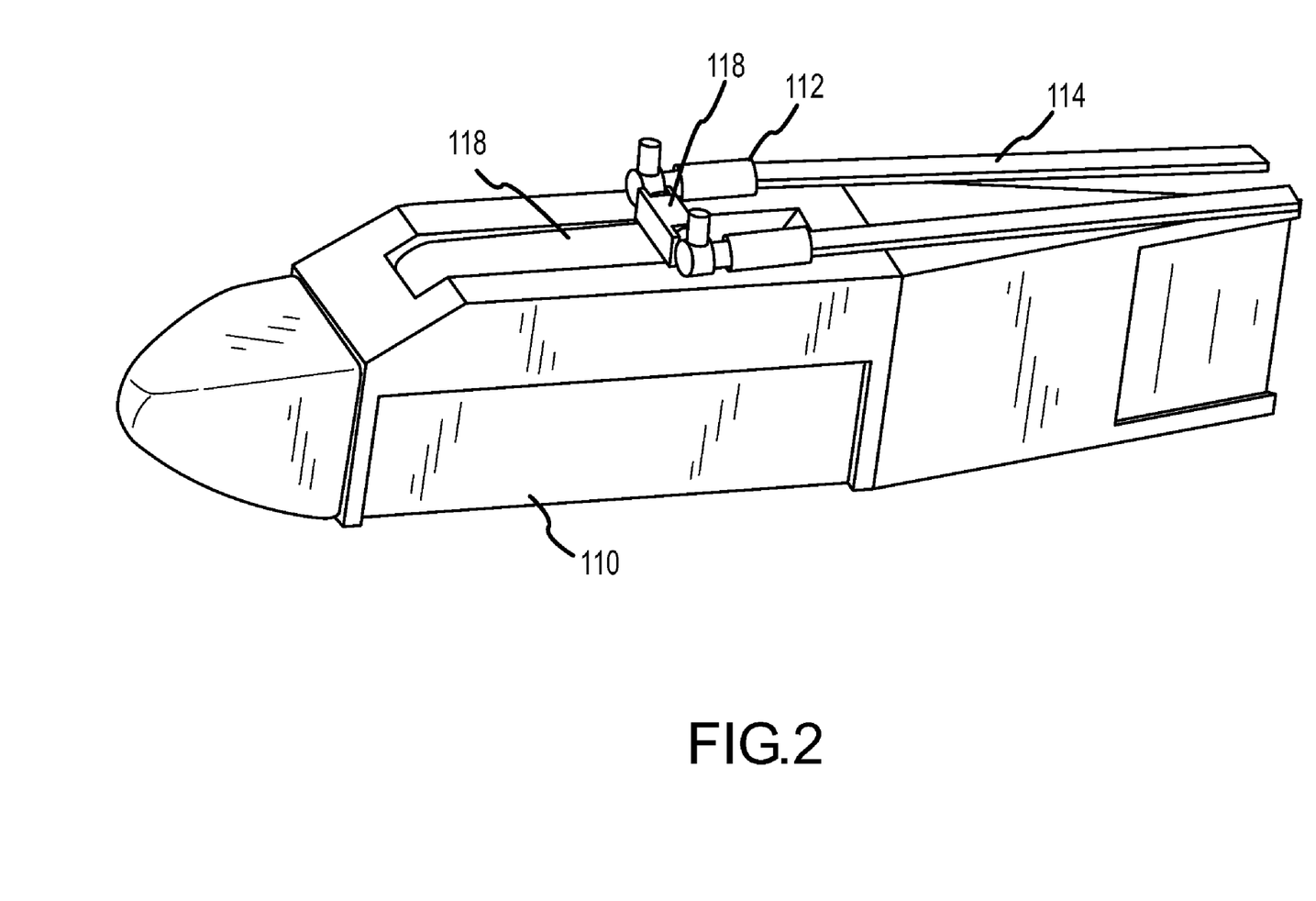
FIG. 2 representatively illustrates the airborne delivery system in a stowable configuration.

The rotor system 112 may also be configured to assume a stowed configuration for storage and transport to a launch site and automatically move to a deployed configuration for flight. The stowed configuration may be any configuration to improve the storage, transport, or other characteristics of the rotor system 112. For example, one or more elements of the rotor system 112 may be configured to collapse, such as by folding, telescoping, or otherwise, to occupy less space than the deployed configuration. Referring to FIG. 2, in the present embodiment, the blades 114 are configured to fold or telescope to reduce the length of the blades 114. In addition, the blades 114 may swing around the rotor head 116 towards an axis, such as parallel to the length of the container 110 such that the blades 114 do not extend beyond the sides and/or ends of the airborne system 100. The mast 118 may also be configured to be lowered so that the blades 114 may be stowed nearer the top of the container 110.

The rotor system 112 may also comprise a blade 114 deployment system to move the rotor system 112 from the stowed configuration to the deployed configuration. The blade deployment system may comprise any suitable system for moving the rotor system 112 into the deployed configuration, such as to extend the blades 114, extend the mast 118, move the blades 114 into position for rotation, and the like. For example, the blade deployment system may comprise one or more actuators, such as mechanical actuators, electromechanical actuators, explosive actuators, springs, hydraulics, and/or other suitable actuators.

In the present embodiment, the blade deployment system moves the blades 114 from the folded position along the axis of the container 110 outward to be evenly spaced around the rotation path of the rotor. The blade deployment system is also suitably configured to extend the blades outward to full length. The blade deployment system may also raise the mast 118.

The rotor system 112 may further include any additional appropriate elements to operate the rotor system 112. For example, the rotor system 112 may include a pre-rotator configured to accelerate the rotor blades 114 to a desired speed upon deployment and then terminate so that the rotor system autorotates without a power source. For example, the pre-rotator may comprise a mechanical system, such as a spring, a pneumatic system, or an electrical system. In one embodiment, the pre-rotator may be integrated into the blade deployment system such that the same elements deploy and accelerate the rotor blades 114. In addition, the pre-rotator may be configured to accelerate the blades 114 in conjunction with the deployment of the rotor system 112. In an alternative embodiment, the pre-rotator may be omitted. The airflow associated with the initial deployment of the airborne system 100 may accelerate the blades 114 to the appropriate speed.

The rotor system 112 may also include control surfaces 316 and actuators to adjust the flight characteristics of the airborne system 100. For example, the rotor system 112 may include a pitch control system to control the pitch of the blades 114. The pitch control system may adjust the pitch of the blades 114 according to any suitable criteria, such as to steer and/or control the descent of the airborne system 100.

The rotor system 112 may be attached to the container 110, directly or indirectly, in any suitable manner. For example, the rotor system 112 may be connected directly to the container 110 using conventional fasteners, such as straps, cables, bolts, welds, clamps, or other suitable connectors. Alternatively, the rotor system 112 may be connected to the container 110 indirectly via an intervening structure.

For example, in the present airborne system 100, the rotor system 112 is mounted on a fuselage 120. The fuselage 120 may comprise any suitable structure for supporting the rotor system 112 and carrying the container 110. The fuselage 120 may be permanently or detachable attached to the container 110, or the container 110 may be integrated into the fuselage 120 structure. The fuselage 120 may also provide control surfaces 316 for controlling the flight of the airborne system 100.

In the present embodiment, the fuselage 120 comprises an aerodynamic airframe having a main section 122, an aft section 124, and a nose section 126. The rotor system 112 is mounted on the main section 122, and the container 110 is secured within a space formed in the bottom of the fuselage 120. The nose section 126 provides an aerodynamic surface for flying. The aft section 124 suitably includes one or more control surfaces 316, such as a rudder and a stabilizing/elevator system, for example comprising a stabilizer, an elevator, and/or a stabilator. One or more elements of the fuselage 120 may be separable, for example to provide access to the container 110, dissemble the airborne system 100, or maintain the airborne system 100. In addition, the fuselage 120 may comprise multiple sections. For example, the nose section 126 and/or the aft section 124 may be attached to the container 110 without connection to the main section 122.

Figure 3:
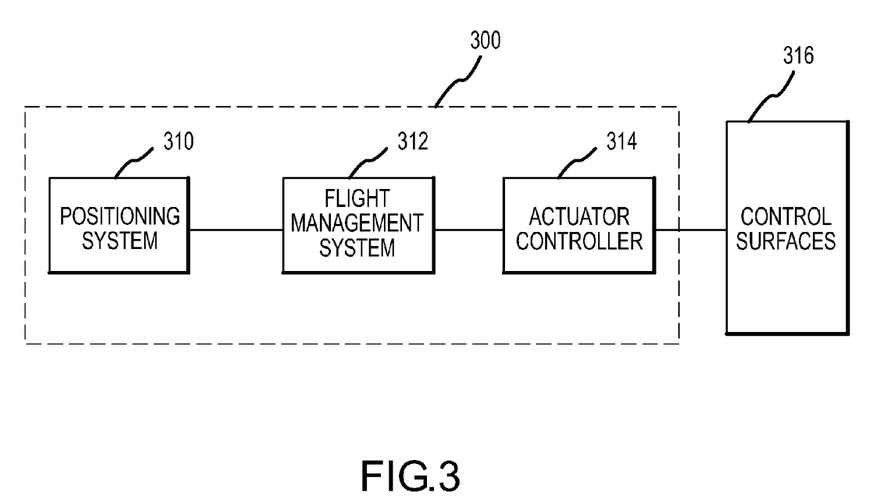
FIG. 3 is a block diagram of a guidance system connected to control surfaces.

The airborne system 100 also suitably includes a guidance system to control the deployment and flight of the airborne system 100. In the present embodiment, the guidance system controls the flight of the airborne system without a propulsion source providing upward or forward thrust other than gravity effects and the autorotating effects of the rotor system 112. Referring to FIG. 3, the guidance system 300 may comprise any suitable system and components, such as a positioning system 310, a flight management system 312, and an actuator controller 314. The positioning system 310 determines the position of the airborne system 100 and provides the current position to the flight management system 312, which manages the flight of the airborne system 100. The flight management system 312 controls the flight by transmitting instructions to the actuator controller 314, which controls the control surfaces 316 accordingly.

The positioning system 310 may comprise any suitable systems and sensors for determining information regarding the airborne system's position and/or environment. For example, the positioning system 310 may include a global positioning system 310 (GPS) receiver and/or an inertial guidance system. The positioning system 310 may also include sensors, such as an airspeed sensor and an altitude sensor. The positioning system 310 may include, however, any appropriate sensors, systems, and other elements for providing relevant data to the flight management system 312.

The flight management system 312 controls the flight according to information from the positioning system 310. In one embodiment, the flight management system 312 includes a memory for storing a flight path. The flight management system 312 receives positional information from the positioning system 310 and compares the current position to the desired position. The flight management system 312 provides signals to the actuator controller 314 to move the airborne system 100 according to the flight path, and the actuator controller 314 adjusts the control surfaces 316 to adjust the flight of the airborne system 100.

In one embodiment, the airborne system 100 may further include one or more rigid wings to provide a gliding capability. For example, referring to FIG. 4, the airborne system 100 may include a wing 410 in addition to the rotor system 112 to facilitate gliding, which may provide greater range and speed. In the present embodiment, the wing 410 may assume a stowable configuration. When launched, the wing 410 is initially deployed, before or concurrently with deployment of the rotor system 112, and the airborne system 100 may glide to a selected location. The airborne vehicle may then slow and utilize the rotor system 112 for a final, near-vertical descent.

The wing 410 may include any appropriate systems and elements to facilitate the gliding capability of the airborne system 100. For example, the wing 410 may include a rigid wing structure mounted on the fuselage 120. In one embodiment, the wing structure may assume a stowable configuration to improve the storage and transport characteristics of the airborne system 100. For example, referring to FIG. 5, the wing 410 may rotate to extend along the long axis of the fuselage 120. The wing 410 may then be rotated into a flight position for deployment. The wing position may be controlled by a wing actuator, such as a mechanical, electrical, hydraulic, pneumatic, or other actuator, configured to move the wing 410 from the stowable configuration to the deployed configuration. The rotor system 112 may also be collapsed and positioned for gliding without operating the rotor system 112, for example along the fuselage 120 or within the nose section 126 or the aft section 124. In the present embodiment, the rotor system 112 is enclosed within the aft section 124. Other protrusions, such as the rudder 412 and stabilator 414 (FIG. 4), may also be retracted and extended or unfolded to change between stowable configuration and the deployed configuration.

Figure 4:
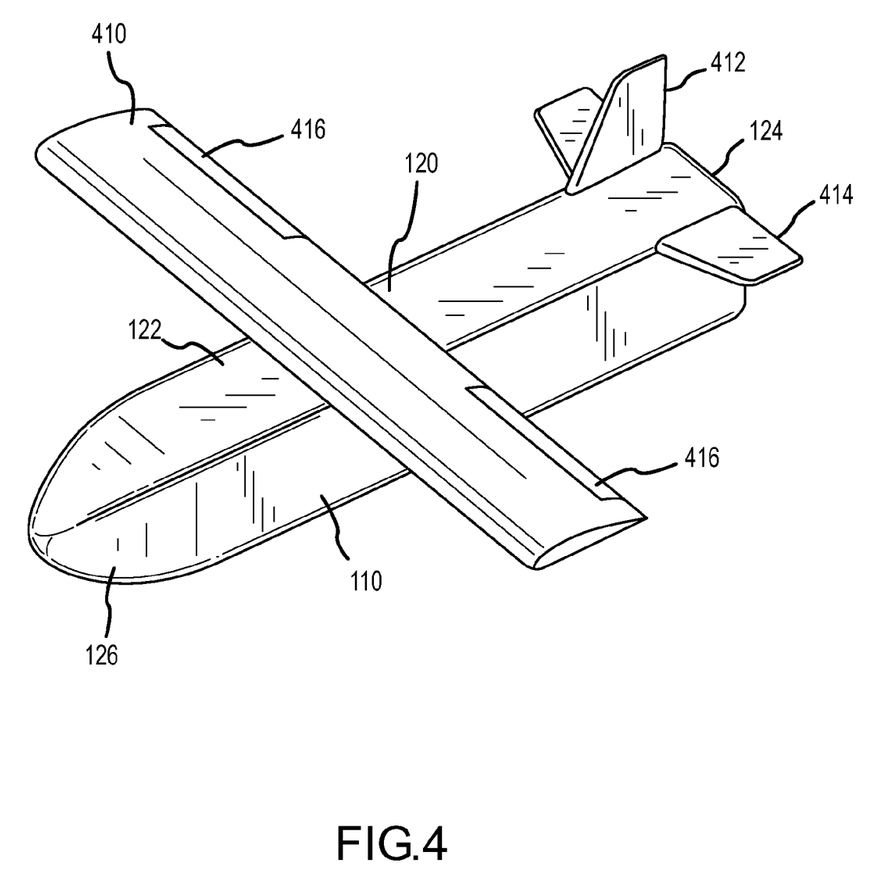
FIG. 4 representatively illustrates an airborne delivery system equipped with a wing.
Figure 5:
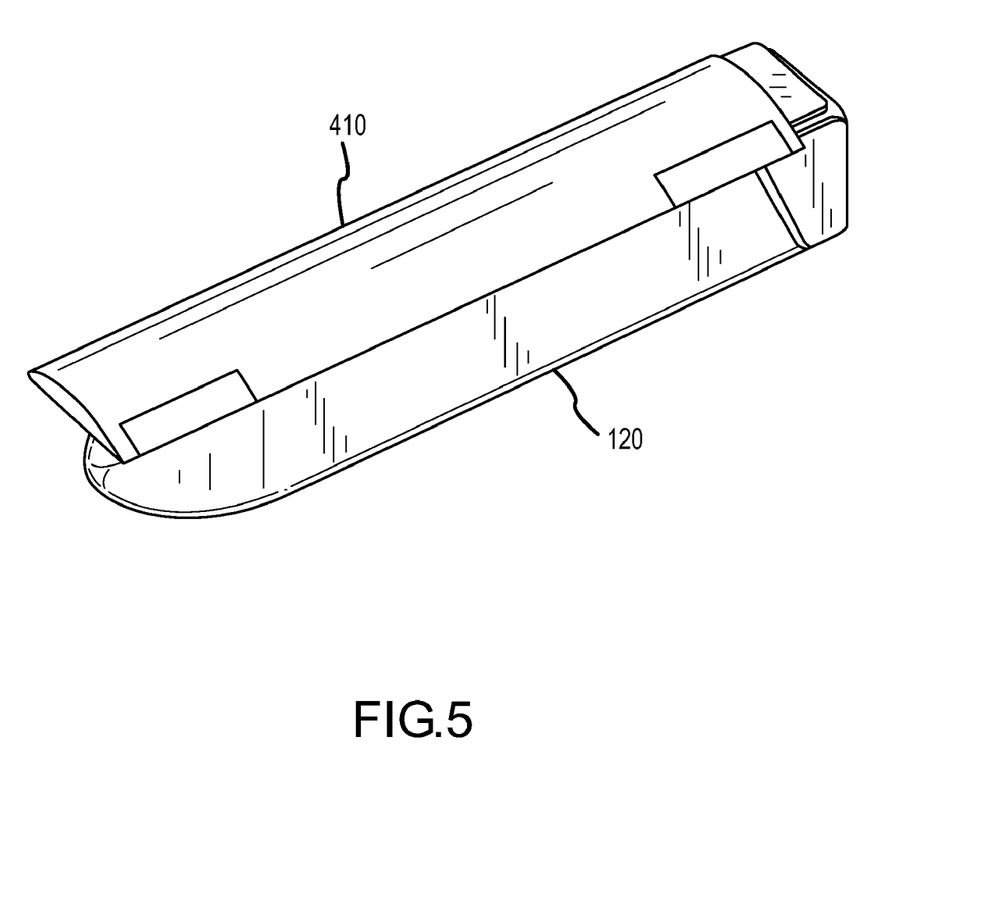
FIG. 5 representatively illustrates the winged airborne delivery system in a stowable configuration.

The wing 410 may also include control surfaces 316. For example, the wing 410 may include one or more ailerons 416. The ailerons 416 may be controlled according to signals from the guidance system 300 to further control the flight of the airborne system 100.

Figure 7:
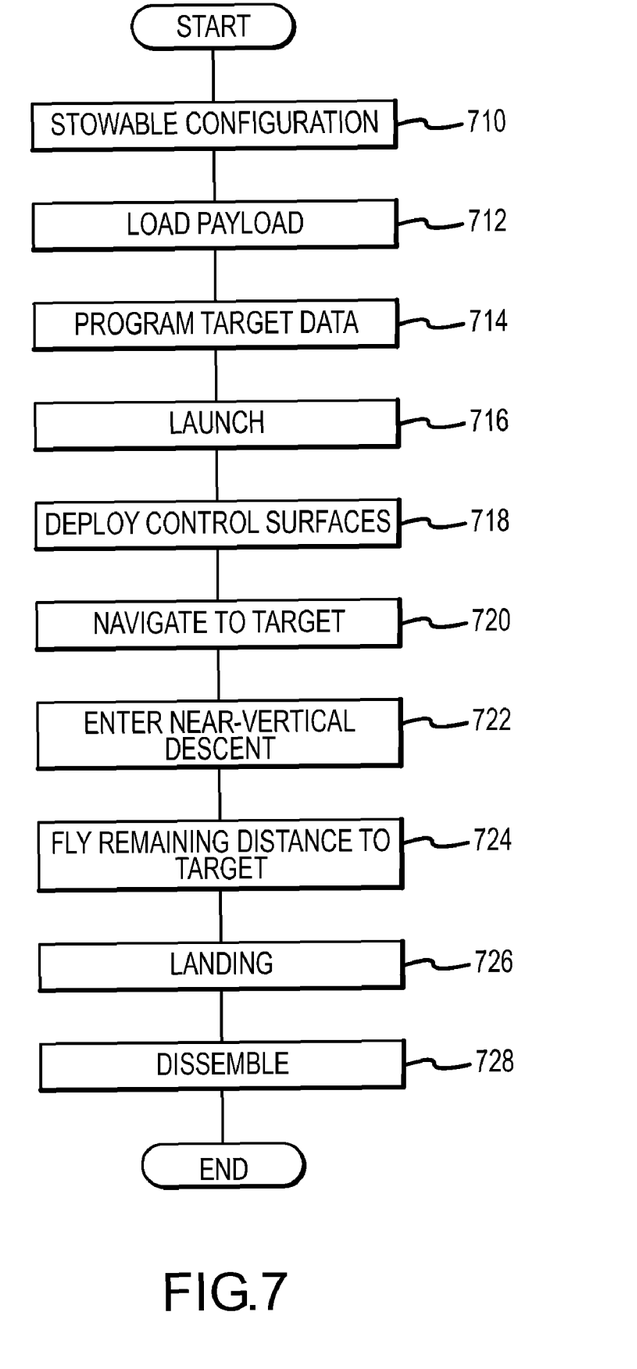
FIG. 7 is a flow diagram of operation of the airborne delivery system.

In operation, referring to FIG. 7, the airborne system 100 is suitably placed in the stowable configuration (710) and a payload is loaded into the container 110 (712). The airborne system 100 may then be prepared for launch. Any suitable system may be used to launch the airborne system 100, such as a rocket delivery system, a gun, or an aircraft. In one embodiment, the airborne system 100 is loaded into a transport holding system, such as a carousel or rack, on a transport aircraft. The transport holding system suitably includes an interface that may communicate with the guidance system 300 to provide target information for the airborne system 100 (714). The airborne system 100 may be programmed, however, in any suitable manner.

When the airborne system 100 is programmed with a target or flight path, the airborne system 100 may be launched (716), for example from the rear of the transport aircraft using a drag chute. When the airborne system 100 is clear of the transport aircraft, the airborne system 100 may deploy one or more control surfaces 316 to control its flight (718). For example, if the airborne system 100 is equipped with the wing 410, the wing 410 may be deployed by swinging the wing 410 into the deployed configuration so that the airborne system 100 may glide to the target. If the airborne system 100 is not configured with a wing 410, the rotor system 112 may be deployed and, if equipped with a pre-rotator, the rotor system 112 may be accelerated to a desired speed to fly the airborne system 100 to the target using the autogyro characteristics of the rotor system 112 for list and the control surfaces of the rotor system 112 to steer. Forward motion is provided by the descent of the airborne system 100 and the control surfaces of the rotor system 112; the airborne system 100 is suitably not equipped with a significant source of forward propulsion or rotor rotation, other than the pre-rotator. The rotor system 112 and/or the wing 410 provide a smaller radar signature than a parachute or comparable delivery system, reducing the likelihood of detection.

Figure 6:
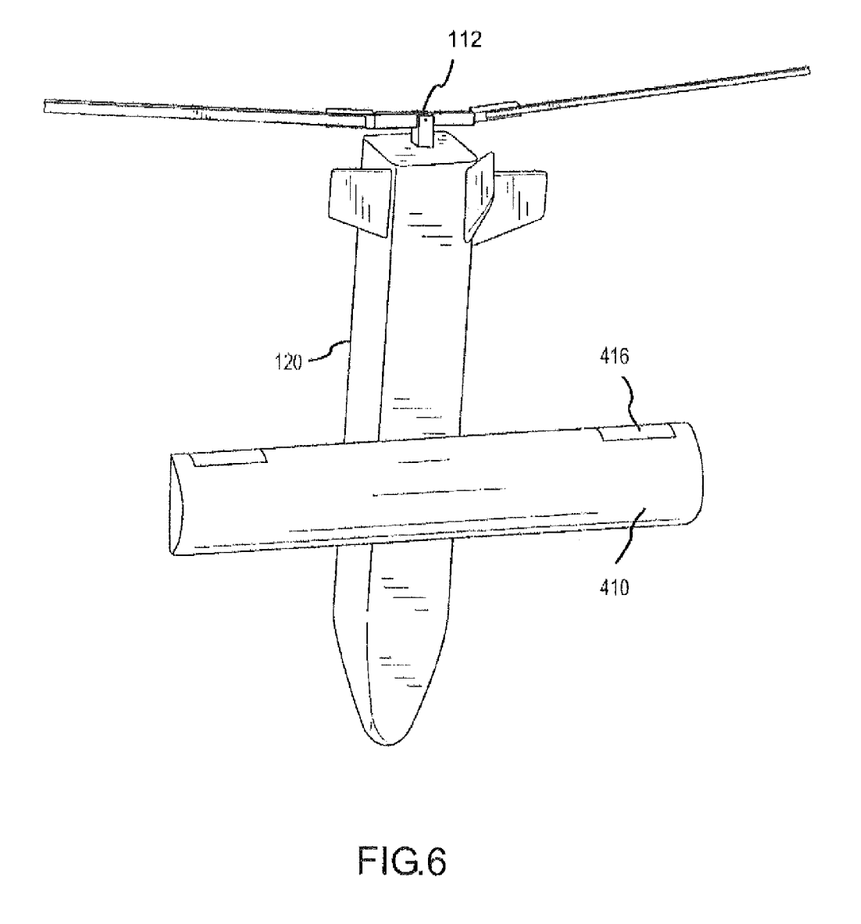
FIG. 6 representatively illustrates the winged airborne delivery system configured for near-vertical descent.

The guidance system 300 determines the position of the airborne system 100, compare the position to the desired flight path, and adjust the control surfaces 316 accordingly to approach the target (720). As the airborne system 100 approaches the target and/or nears the ground such as about 100 feet from the ground, the airborne system 100 may reduce airspeed and enter a near-vertical descent (722). If the airborne system 100 is not equipped with the wing 410, then the airborne system 100 may enter the near-Vertical descent by adjusting the control surfaces 316 of the rotor system 112. if the airborne system 100 is equipped with the wing 410, the airborne system 100 may reduce airspeed and deploy the rotor in any suitable manner. For example, if the rotor system 112. is in the nose section 126, the airborne system 100 may open or release the nose section 126 and pull up to an approximately zero-C condition with the forward end of the airborne vehicle 100 pointing upwards. In the present embodiment having the rotor system 112 in the aft section 124, the airborne system. may be slowed to approximately the stall speed of the airborne system 100 to reduce the shock upon the rotor system 112 upon deployment. The rotor system 112 may then be deployed and accelerated to a desired speed to provide initial lift.

The airborne system 100 flies the remaining distance under autorotation and guided by the guidance system 300 (724). The guidance system 300 may control the descent according to any suitable criteria, such as the anticipated terrain and/or the fragility of the container 110 contents. As the airborne system 100 approaches its landing, the guidance system 300 may adjust the pitch of the rotor blades 114 to perform a flare before touchdown to minimize the impact of the landing (726).

When the airborne system 100 lands, the contents may be removed. In addition, the guidance system 300 may be erased to ensure that no information of importance may be read from the guidance system 300. The airborne system 100 may then be dissembled, for example for burial or camouflage (728). In the present embodiment, the airborne system 100 may be separated into individual rotor blades 114, the rotor head 116, the mast 118, the main, aft, and nose section 122, 124, 126 of the fuselage 120, the guidance system 300, and the container 110.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any appropriate order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. An airborne delivery system, comprising:
    an unmanned container comprising a body and an end section;
    a wing connected to the body of the container, wherein the wing is configured to move from a stowed position to a deployed position;
    an unpowered rotor connected to the end section, wherein the unpowered rotor:
        is configured to move from a stowed position to a deployed position; and
        comprises a set of deployable rotor blades disposed against an exterior surface of the body of the container when the unpowered rotor is in the stowed position; and
    a guidance system linked to the wing and the unpowered rotor, wherein the guidance system is adapted to control a flight path of the delivery system by controlling the wing and the unpowered rotor.

2. An airborne delivery system according to claim 1, wherein the wing is rotatably connected to the exterior surface of the body of the container.

3. An airborne delivery system according to claim 2, wherein the wing is aligned with a longitudinal axis of the container when the wing is in the stowed position and is aligned substantially perpendicular to the longitudinal axis when the wing is in the deployed position.

4. An airborne delivery system according to claim 1, further comprising a deployable control surface connected to container.

5. An airborne delivery system according to claim 4, wherein the control surface is positioned against the exterior surface of the body of the container until the wing is deployed.

6. An airborne delivery system according to claim 4, wherein the control surface comprises at least one of a rudder, a stabilizer, and an elevator.

7. An airborne delivery system according to claim 1, wherein the unpowered rotor comprises:
    a central hub rotatably connected to the end section, wherein
        a set of deployable rotor blades are pivotally connected to the central hub, and the rotor blades are:
            extended outward from the body and perpendicular to a longitudinal axis of the container when the unpowered rotor is in the deployed position; and
            adapted to affect a rate of a substantially vertical descent of the airborne delivery system when the unpowered rotor is in the deployed position.

* * * * *